(12) United States Patent
Hirthammer

(10) Patent No.: US 12,078,994 B2
(45) Date of Patent: Sep. 3, 2024

(54) METHOD OF TRAVEL LANE PLANNING OF A PLURALITY OF AGRICULTURAL WORKING MACHINES

(71) Applicant: HORSCH LEEB Application Systems GmbH, Landau an der Isar (DE)

(72) Inventor: Daniel Hirthammer, Schwandorf (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 181 days.

(21) Appl. No.: 17/219,018

(22) Filed: Mar. 31, 2021

(65) Prior Publication Data

US 2021/0311481 A1 Oct. 7, 2021

(30) Foreign Application Priority Data

Apr. 1, 2020 (DE) .......................... 102020109013.7

(51) Int. Cl.
| | |
|---|---|
| *G05D 1/00* | (2024.01) |
| *A01B 69/04* | (2006.01) |
| *A01C 7/08* | (2006.01) |
| *A01C 23/04* | (2006.01) |
| *A01M 7/00* | (2006.01) |

(52) U.S. Cl.
CPC ......... *G05D 1/0214* (2013.01); *A01B 69/008* (2013.01); *A01C 7/08* (2013.01); *A01C 23/047* (2013.01); *A01M 7/0089* (2013.01); *G05D 1/0088* (2013.01); *G05D 1/0287* (2013.01)

(58) Field of Classification Search
CPC .. G05D 1/0214; G05D 1/0088; G05D 1/0287; G05D 2201/0201; G05D 1/0219; A01B 69/008; A01C 7/08; A01C 23/047; A01C 21/005; A01M 7/0089
See application file for complete search history.

(56) References Cited

U.S. PATENT DOCUMENTS

| | | | |
|---|---|---|---|
| 2006/0178825 A1 | 8/2006 | Eglington et al. | |
| 2007/0192024 A1* | 8/2007 | Flann | G05D 1/0219 |
| | | | 701/425 |
| 2009/0118904 A1* | 5/2009 | Birnie | A01B 69/008 |
| | | | 701/41 |
| 2012/0296529 A1* | 11/2012 | Peake | A01M 7/0089 |
| | | | 701/50 |
| 2017/0144702 A1* | 5/2017 | Dang | B62D 6/001 |
| 2017/0202131 A1* | 7/2017 | Bunderson | B60W 10/04 |
| 2017/0308091 A1* | 10/2017 | Bunderson | A01B 69/008 |

(Continued)

FOREIGN PATENT DOCUMENTS

| | | |
|---|---|---|
| DE | 102017103141 A1 | 8/2018 |
| EP | 2417844 B1 | 5/2017 |

*Primary Examiner* — Abdalla A Khaled
(74) *Attorney, Agent, or Firm* — AVEK IP, LLC; Mark C. Young

(57) ABSTRACT

A method for travel lane planning of a plurality of agricultural working machines, on a usable agricultural area where the machines at least partially comprise different turning radii. The method comprises a computer-assisted planning of a travel lane infrastructure relative to the usable agricultural area for travel over the usable agricultural area by the plurality of agricultural working machines, wherein the travel lane infrastructure comprises at least one curve section which is planned on the basis of the different turning radii of the plurality of agricultural working machines.

14 Claims, 3 Drawing Sheets

(56) References Cited

U.S. PATENT DOCUMENTS

| | | | | |
|---|---|---|---|---|
| 2017/0354078 A1* | 12/2017 | Foster | ................... | A01B 69/00 |
| 2017/0354079 A1* | 12/2017 | Foster | ................. | A01B 69/008 |
| 2018/0359905 A1* | 12/2018 | Foster | ................. | G05D 1/0219 |
| 2018/0373257 A1* | 12/2018 | Runde | ................. | A01B 69/008 |
| 2019/0277636 A1* | 9/2019 | Birnie | ................. | A01B 69/008 |
| 2019/0353483 A1* | 11/2019 | Liu | ...................... | G05D 1/0219 |
| 2020/0156470 A1* | 5/2020 | Stanhope | ............... | A01B 79/02 |
| 2021/0173399 A1* | 6/2021 | Richard | ................ | G01M 17/03 |
| 2021/0337715 A1* | 11/2021 | Fujimoto | ............ | G05D 1/0278 |
| 2021/0389771 A1* | 12/2021 | Nishii | ................. | G05D 1/0278 |
| 2022/0105960 A1* | 4/2022 | Yuki | .................... | B60W 10/04 |
| 2022/0232750 A1* | 7/2022 | Shirafuji | ............. | G05D 1/0278 |
| 2022/0272889 A1* | 9/2022 | Yoshimura | ........... | G05D 1/0278 |

* cited by examiner

METHOD OF TRAVEL LANE PLANNING OF A PLURALITY OF AGRICULTURAL WORKING MACHINES

CROSS-REFERENCE TO RELATED APPLICATIONS

This application claims the benefit of German Patent Application No. DE 10 2020 109 013.7, filed Apr. 1, 2020, the disclosure of which is hereby incorporated herein in its entirety by reference.

BACKGROUND

The present invention relates to a method for travel lane planning of an agricultural working machine, a method for travel lane planning of a plurality of agricultural working machines and a method for planning a working width setting of an agricultural working machine. The invention further relates to an agricultural working machine.

For simplifying the operation of agricultural machines for the improved performance of agricultural working processes, in the agricultural industry working processes which are increasingly automated, preferably planned in advance, are being developed and used. In particular, autonomous machines, i.e. partially autonomous or fully autonomous machines, are a current development trend.

A sub-area of the increasing automation in agricultural technology concerns automatic lane planning for travelling over a usable agricultural area. Travel lanes which may be travelled over by an agricultural machine may be defined on the usable agricultural area, whilst the agricultural machine cultivates and/or treats the usable agricultural area.

For example, a method for controlling an agricultural working machine using an electronic driving lane system is disclosed in EP 2 417 844 B1. Defined driving routes to be travelled in a prescribed direction of travel in a area of land to be worked, in particular in already grown plant stock, are assigned to the agricultural working machine.

The object of the invention is to provide alternative and/or improved travel lane planning relative to a usable agricultural area, preferably for operating one or more autonomous agricultural working machines.

The object is achieved by the features of the independent claim. Advantageous developments are specified in the dependent claims and the description.

One aspect of the present disclosure relates to a method for travel lane planning of an agricultural working machine which is able to be driven in a plurality of different states on a usable agricultural area. The method comprises a travel lane infrastructure which is planned in a computer-assisted manner for travel over the usable agricultural area by the agricultural working machine. The method further comprises predetermining a plurality of alternative set point travel speeds of the agricultural working machine relative to a section of the travel lane infrastructure, as a function of the state of the plurality of different states in which the agricultural working machine travels over the section.

The method may have the advantage that the usable agricultural area may be cultivated in an improved manner and/or in a shorter time. The working machine does not travel over the travel lane infrastructure at a constant travel speed but at a travel speed adapted to the respective state of the working machine (for example distribution of material to be distributed, harvesting of harvested crops, empty running, or the like). The set point travel speed assigned to the respective state (and section) may be selected as a function of the state in which the working machine travels over the section. For example, therefore, already in the planning phase of the use on the usable agricultural area it is possible to plan that a section 1 is to be travelled over at 5 km/h during spraying but at 15 km/h in a transport position of a spray boom of the working machine. A section 2 may be travelled over at 10 km/h during spraying and at 20 km/h in a transport position of the spray boom, etc.

In an exemplary embodiment, the predetermining of a plurality of alternative set point travel speeds of the agricultural working machine is performed relative to a plurality of sections of the travel lane infrastructure.

In a further exemplary embodiment, the planning of the travel lane infrastructure and/or the predetermining of the plurality of alternative set point travel speeds is performed externally from the agricultural working machine. Optionally, the method may also comprise a transmission of the planned travel lane infrastructure and/or the predetermined plurality of alternative set point travel speeds to a control unit of the agricultural working machine.

In a further exemplary embodiment, the method also comprises (for example an automatic) setting of an actual travel speed of the agricultural working machine when travelling over the section corresponding to the predetermined plurality of alternative set point travel speeds, as a function of the state of the plurality of different states in which the agricultural working machine travels over the section, preferably in real time and/or by means of a control unit of the agricultural working machine.

In an embodiment, the predetermining comprises a plurality of alternative set point travel speeds, a predetermining of a first set point travel speed of the agricultural working machine relative to the section, in the case where the agricultural working machine travels over the section in a first state of the plurality of different states. Preferably, the predetermining of a plurality of alternative set point travel speeds also comprises a predetermining of a second set point travel speed of the agricultural working machine relative to the section in the case where the agricultural working machine travels over the section in a second state of the plurality of different states. Optionally, the predetermining of a plurality of alternative set point travel speeds also comprises a predetermining of at least one further set point travel speed of the agricultural working machine relative to the section, in at least one case where the agricultural working machine travels over the section in at least one further state of the plurality of different states.

In a further embodiment, the different states of the agricultural working machine comprise at least one of:

- a working state in which the usable agricultural area is treated or cultivated by the agricultural working machine, preferably by distributing material to be distributed (for example sowing or spraying or fertilizing) or harvesting or soil cultivation;
- a working position state in which an implement of the agricultural working machine is set, preferably is extended or folded out, in a working position, preferably without being operated;
- a transport position state in which an implement of the agricultural working machine is set, preferably is retracted or folded-in, in a transport position; and
- an empty running state in which a storage device, preferably an energy storage device, storage tank (for example seed tank, spray agent tank, or the like), operating medium tank or fuel tank of the agricultural working machine is empty or falls below a predetermined limit value.

In a further embodiment, the agricultural working machine is a distribution machine, a sowing machine, a field sprayer, a fertilizer spreader, a harvesting machine, a soil cultivation machine or a tractor. Alternatively, the agricultural working machine may comprise, for example, a distribution machine, a sowing machine, a field sprayer, a fertilizer spreader, a harvesting machine, a soil cultivation machine or a tractor.

In a variant, the plurality of alternative set point travel speeds are predetermined in the form of a plurality of alternative set point travel speed ranges. Alternative, the plurality of alternative set point travel speeds, for example, may be predetermined as discrete numerical values.

In a further embodiment, the method comprises a setting of an actual travel speed of the agricultural working machine when travelling over the section within the predetermined plurality of alternative set point travel speed ranges as a function of a traction of the agricultural working machine and/or a state of the section and/or the usable agricultural area.

In a further embodiment, the traction is determined by a monitoring system, preferably an anti-lock braking system, and/or a sensor system, preferably for detecting the soil moisture and/or soil compaction, of the agricultural working machine. Alternative or additionally, the state of the section and/or the usable agricultural area may be detected by a sensor system, preferably for detecting the soil moisture and/or soil compaction (for example compacted, muddy, etc.) of the agricultural working machine.

In a further variant, in the case of low traction and/or a moist and/or muddy state of the section and/or the usable agricultural area, a lower actual travel speed is set within the respective set point travel speed range than in the case of greater traction and/or a dry and/or compacted state of the section or the usable agricultural area.

In an exemplary embodiment, the method comprises a setting of an actual travel speed of the agricultural working machine when travelling over the section within the predetermined plurality of alternative set point travel speed ranges as a function of a quantity of a material to be distributed, which is to be distributed in the section by the agricultural working machine.

In a further exemplary embodiment, the method also comprises a predetermining of a plurality of alternative starting points and/or a plurality of alternative target points of the section as a function of the state of the plurality of different states in which the agricultural working machine travels over the section.

In a further embodiment, the predetermining of a plurality of alternative starting points and/or a plurality of alternative target points comprises a predetermining of a first starting point and/or a first target point of the section in the case where the agricultural working machine travels over the section in a first state of the plurality of different states. A second starting point and/or a second target point of the section may be predetermined in the case where the agricultural working machine travels over the section in a second state of the plurality of different states. Optionally at least one further starting point and/or at least one further target point of the section may be predetermined in at least the case where the agricultural working machine travels over the section in at least one further state of the plurality of different states.

In a further embodiment, it may be provided that the regions for the starting points and/or target points may also be predetermined.

In an embodiment, the section comprises at least one, preferably substantially linear, travel lane of the travel lane infrastructure, or the section corresponds to a travel lane, which is preferably substantially linear, of the travel lane infrastructure. Alternatively, the section may correspond to a partial section of a preferably substantially linear travel lane of the travel lane infrastructure. Alternatively, the section may correspond to a headland of the travel lane infrastructure or comprise a headland of the travel lane infrastructure.

The present disclosure also relates to an agricultural working machine which is preferably configured to perform a method as disclosed herein. The agricultural working machine comprises a control unit which is configured to adapt in an automated manner an actual travel speed of the agricultural working machine to one of a plurality of alternative set point travel speeds of the agricultural working machine when travelling over a section of a travel lane infrastructure, which is planned in a computer-assisted manner, relative to a usable agricultural area, as a function of a current state of the agricultural working machine, wherein the plurality of alternative set point travel speeds for the section are predetermined for a plurality of different states of the agricultural working machine.

A further aspect of the present disclosure relates to a method for travel lane planning of a plurality of agricultural working machines, which at least partially comprise different turning radii, on a usable agricultural area. The method comprises a travel lane infrastructure, which is planned in a computer-assisted manner, relative to the usable agricultural area, for travel over the usable agricultural area by the plurality of agricultural working machines, wherein the travel lane infrastructure comprises at least one curve section which is planned on the basis of the different turning radii of the plurality of agricultural working machines.

The method may have the advantage that the curve section may be optimized by considering the different turning radii of the working machines, i.e. for example across an entire fleet of vehicles of an agricultural operation. Depending on the requirement, for example, it may thus be ensured that the plurality of working machines are actually able to travel over the curve section, that an area located in the region of the curve section is passed over as a whole as little as possible, or passed over with the greatest possible distribution.

In an exemplary embodiment, the at least one curve section is planned in a single variant which is adapted to the largest turning radius of the different turning radii.

In a further exemplary embodiment, the at least one curve section is planned in a plurality of variants for the different turning radii of the plurality of agricultural working machines. Preferably, a number of variants may be less than or equal to a number of the different turning radii. Preferably, the plurality of variants may comprise at least one U-shaped turning variant, at least one Y-shaped turning variant, at least one K-shaped turning variant and/or at least one keyhole-shaped turning variant.

In a further embodiment, the plurality of variants are adapted to one another such that an area which is passed over as a whole according to the plurality of variants is minimized and/or the plurality of variants are adapted to one another such that areas which are passed over together according to the plurality of variants are maximized.

In a further exemplary embodiment, the plurality of variants are adapted to one another such that the plurality of variants substantially do not coincide, or the plurality of variants are adapted to one another such that areas which are passed over together according to the plurality of variants are minimized. For example, calculation algorithms or optimization algorithms may be used for the adaptation.

Preferably, for example, a calculation algorithm and/or optimization algorithm may be used for the adaptation. Preferably, the calculation algorithm and/or optimization algorithm may use as input variables the different turning radii and optionally a size and/or dimension and/or a shape of a region in which the curve section is arranged. The curve section may be output as an output variable.

In an embodiment, the at least one curve section is planned within a region, the dimension thereof, preferably the length and/or width, and/or the shape thereof, preferably a freeform or polygonal shape, being predeterminable. Alternatively, the at least one curve section may be planned within a region, the dimension thereof, preferably the length and/or width, and/or the shape thereof, preferably a freeform or polygonal shape, being planned as a function of the different turning radii of the plurality of agricultural working machines.

In a further embodiment, the at least one curve section comprises a curve section for bypassing an obstacle on the usable agricultural area and/or a curve section in a headland of the usable agricultural area.

In a further embodiment, the plurality of agricultural working machines comprise at least one tractor, at least one distribution machine, at least one sowing machine, at least one field sprayer, at least one fertilizer spreader, at least one harvesting machine and/or at least one soil cultivation machine.

In a variant, the planning of the travel lane infrastructure is carried out externally from the plurality of agricultural working machines. Optionally, the method may also comprise a transmission of the planned travel lane infrastructure to a control unit of one, a plurality, or all of the plurality of agricultural working machines, preferably with the respectively planned variant of the curve section for the respective turning radius of the working machine.

In a further variant, the at least one curve section is additionally planned on the basis of different working widths, different lane widths and/or different wheelbases of the plurality of agricultural working machines. Thus according to a further variant, the at least one curve section may be planned on the basis of the vehicle geometry, preferably on the basis of the vehicle geometry of a plurality of agricultural working machines.

In an exemplary embodiment, the plurality of agricultural working machines at least partially comprise different working widths and preferably the travel lane infrastructure, as a function of the plurality of different working widths, comprises a plurality of substantially parallel travel lanes which are preferably spaced apart from one another substantially equal to the smallest working width of the plurality of agricultural working machines.

In a further exemplary embodiment, the method also comprises a planning of a main travel route through the travel lane infrastructure, wherein the main travel route comprises and/or uses each of the plurality of travel lanes. The method may preferably also comprise a planning of at least one secondary travel route through the travel lane infrastructure as a function of one respective working width of the agricultural working machine, wherein the secondary travel route comprises and/or uses only a part of the plurality of travel lanes, preferably only each x-th lane of the plurality of travel lanes, wherein x is a natural number ≥2.

In a further embodiment, the planning of the main travel route and/or the at least one secondary travel route is carried out externally from the plurality of agricultural working machines or by means of the respective agricultural working machine.

In an embodiment, the at least one secondary travel route is planned as a function of a predetermined working width tolerance of the agricultural working machine.

In a further embodiment, the method also comprises a planning of a distribution of a material to be distributed of an agricultural distribution machine of the plurality of agricultural working machines, as a function of the main travel route and the at least one secondary travel route of the plurality of agricultural working machines.

The present disclosure also relates to an agricultural working machine, which is preferably configured for performing a method as disclosed herein. The agricultural working machine comprises a control unit which is configured to travel in an automated manner over a travel lane infrastructure, which is planned in a computer-assisted manner, relative to a usable agricultural area, wherein the travel lane infrastructure comprises at least one curve section which is planned on the basis of different turning radii of a plurality of agricultural working machines.

A further aspect of the present disclosure relates to a method for planning a working width setting of an agricultural working machine, with a settable working width on a usable agricultural area which comprises a plurality of travel lanes (for example a travel lane infrastructure which is planned in a computer-assisted manner) which follow one another and run adjacent to one another (for example substantially parallel to one another). The method comprises a travel lane-related planning of a working width path along the plurality of travel lanes, wherein for at least one section of a travel lane of the plurality of travel lanes, preferably for all of the travel lanes, a path of a travel lane of the plurality of travel lanes following the travel lane is (for example directly) considered.

The method may have the advantage that a more accurate and more uniform cultivation or treatment of the usable agricultural area is possible. In particular, the distribution of material to be distributed (for example seed, fertilizer or plant protection agent) may be improved, since the working width path of the section of the travel lane is planned in advance. Thus it may be determined whether optionally the cultivation or treatment of the section of the travel lane may be performed more optimally (for example more rapidly, more accurately or more uniformly, etc.) from the following travel lane.

Preferably, the expression "working width path" may relate to a path of a working width setting of a changeable working width of the agricultural working machine along a travel lane.

Preferably, the section may be reached at least partially from the following travel lane, preferably if the agricultural working machine is operated on the following travel lane at a maximum working width.

For example, the expression "following travel lane" may refer to a (for example second) travel lane which may be approached according to a route planning and/or route guidance of the agricultural working machine according to the (for example first) travel lane.

In an exemplary embodiment, the section is a curve section which is preferably arcuate, which bulges out toward the following travel lane, which bypasses an obstacle on the usable agricultural area and/or which approaches the following travel lane.

In a further exemplary embodiment, the working width path in the curve section is planned such that a limit of the working width path facing the following travel lane follows the path of the following travel lane at a substantially equal distance, preferably when the following travel lane comprises a straight section which opposes the curve section, or a curve section which is curved to a lesser extent than the curve section of the travel lane and opposes the curve section of the travel lane.

In a further exemplary embodiment, the working width path on a side of the following travel lane facing the travel lane is planned for a maximum working width of the agricultural working machine, and preferably the working width path in the curve section on a side of the travel lane facing the following travel lane is planned to be adjacent to the working width path of the following travel lane, preferably when the following travel lane comprises a straight section which opposes the curve section, or a curve section which is curved to a lesser extent than the curve section of the travel lane and which opposes the curve section of the travel lane.

In an embodiment, the travel lane-related planning is carried out externally from the agricultural working machine, and optionally the method also comprises a transmission of a result of the travel lane-related planning to the agricultural working machine.

In a further embodiment, the travel lane-related planning is performed by the agricultural working machine (for example by a control unit of the agricultural working machine), preferably before treating or cultivating the usable agricultural area or in real time.

In a further embodiment, a forward direction of travel of the agricultural working machine in the travel lane opposes a forward direction of travel of the agricultural working machine in the following travel lane.

In a variant, the method also comprises a partially automated or fully automated cultivation or treatment of the usable agricultural area by means of the agricultural working machine corresponding to the travel lane-related planning.

In a further variant, a path of a previous travel lane of the plurality of travel lanes is considered for at least the section and/or a further section of the travel lane or a further travel lane, preferably for all of the travel lanes.

In an exemplary embodiment, the travel lane-related planning for the plurality of travel lanes are adapted to one another by considering a path of substantially all of the travel lanes of the usable agricultural area.

In a further exemplary embodiment, the agricultural working machine is a distribution machine, preferably a sowing machine, a field sprayer or a fertilizer spreader, for distributing a material to be distributed (for example seed, plant protection agent or fertilizer, etc.)

In a further embodiment, the distribution machine comprises a distribution device, preferably a spray boom, which is able to be switched off in sections according to the travel lane-related planning of the working width path, preferably in an automated manner when travelling over the section.

In an embodiment, the travel lane-related planning takes place with a target function for equalizing a dispensing of material to be distributed by the agricultural working machine over the usable agricultural area and/or with a target function for reducing a size of at least one area section, in which in the case of a curve a dispensing of material to be distributed is carried out as a function of the angular velocity.

In a further embodiment, the method also comprises a planning of a (for example uniform or non-uniform) distribution of a material to be distributed on the usable agricultural area, wherein the travel lane-related planning of the working width path is also based on the planning of the distribution.

In a further embodiment, the planning of the distribution is based on at least one detected and/or documented previous working process on the usable agricultural area, preferably on a previous dispensing of material to be distributed on the usable agricultural area.

The present disclosure also relates to an agricultural working machine which is preferably configured for performing a method according to one of the preceding claims. The agricultural working machine comprises a control unit which is configured to adapt in an automated manner a working width setting of a settable working width of the agricultural working machine when travelling over a travel lane of a plurality of travel lanes of a usable agricultural area, wherein the automated adaptation of the working width setting for at least one section of the travel lane, preferably for all of the travel lanes, considers a path of a travel lane of the plurality of travel lanes following the travel lane, wherein the plurality of travel lanes follow one another and run adjacent to one another.

Preferably, the term "control unit" may refer to an electronic unit (for example with microprocessor(s) and a data storage device) and/or a mechanical, pneumatic and/or hydraulic controller which, depending on the design, may undertake control tasks and/or regulating tasks and/or processing tasks. Although the term "control" is used herein, equally expediently "regulation" and/or "feedback control" and "processing" may also be encompassed and/or understood thereby.

DESCRIPTION OF THE DRAWINGS

The preferred embodiments and features of the invention described above are able to be combined with another in any manner, in particular also features which are assigned different aspects of the present disclosure. Further details and advantages of the invention are described hereinafter with reference to the accompanying drawings, in which:

The embodiments shown in the figures at least partially coincide so that parts which are similar or identical are provided with the same reference numerals and for the description thereof reference is also made to the description of the other embodiments and/or figures in order to avoid repetition.

FIG. 1 shows a usable agricultural area 10 (for example an agricultural field). The usable agricultural area 10 may be cultivated by a mobile agricultural working machine 12. The mobile agricultural working machine 12 is preferably configured as an autonomous agricultural working machine, for example as a partially autonomous/partially automated working machine or as a fully autonomous/fully auto-mated working machine. For example, the agricultural working machine 12 may travel partially or fully autonomously over the usable agricultural area and/or cultivate and/or treat partially or fully autonomously the usable agricultural area 10 whilst it travels or is driven over the usable agricultural area 10. The working machine 12 may comprise a control unit which is configured therefor, for example a so-called machine management system being able to be operated thereon. The control unit may monitor, control, regulate and/or parametrize working processes of the working machine 12 and optionally a traction vehicle of the working machine 12.

The working machine 12 may be a distribution machine (for example a field sprayer or fertilizer spreader or sowing machine) and/or a soil cultivation machine (for example a hoeing machine or scarifier machine, etc.). The working machine 12 may, for example, also be a harvesting machine, for example a combine harvester or a forage harvester. The working machine 12 may also be an agricultural traction machine (for example a tractor). The working machine 12 may be configured as a self-propelled working machine. The working machine 12, however, may also be a working machine towed by means of a traction vehicle or a working machine attached to a traction vehicle. The working machine 12 may thus in principle be any type of working machine which is suitable for agricultural use and/or for performing agricultural working processes.

It is possible that the working machine 12 comprises a variable and/or settable working width. For example, the working machine 12 may comprise a distribution boom (for example a spray boom) which may be switched off in sections. The working width, for example, may be divided into partial widths, which partial widths are correspondingly able to be switched off. The distribution boom may comprise distribution elements (for example distribution nozzles) for distributing a material to be distributed. The working machine 12 may also comprise, for example, a frame construction with soil cultivation tools or sowing shares, etc. which are arranged so as to be distributed over the working width, wherein in order to change a working width of the working machine 12 these implements may be brought at least in sections into engagement or out of engagement with the soil of the usable area 10. Alternatively or additionally, in order to change a working width these implements may also be subjected (i.e. supplied with) or correspondingly not subjected, to the material to be distributed, wherein this may also be carried out in partial widths. Alternatively, the working machine may also comprise a fixed working width, preferably when said working machine comprises a small overall working width.

Figure 1:
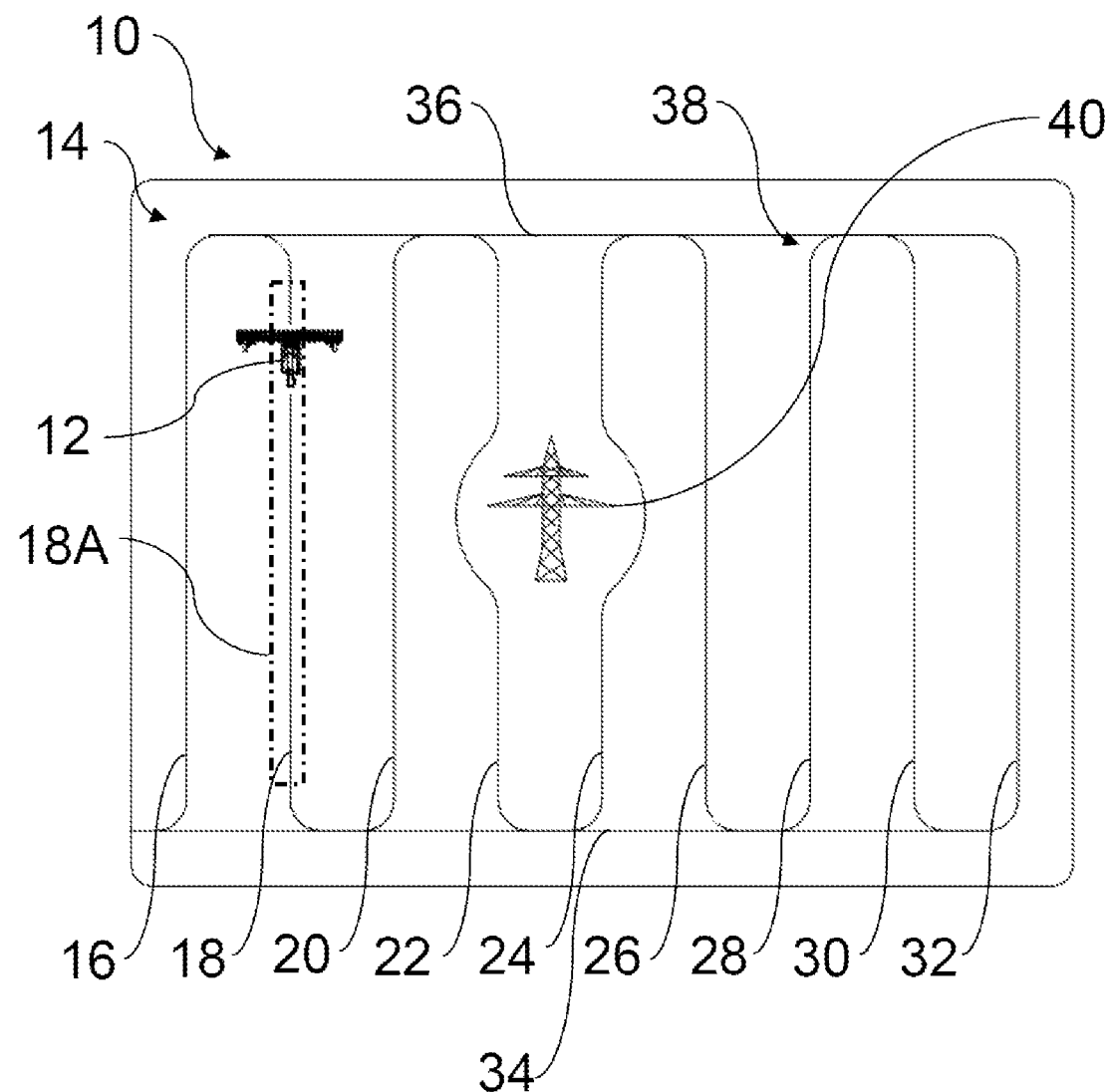
FIG. 1 shows a schematic plan view of a usable agricultural area with a mobile agricultural working machine.

The working machine 12 may navigate and/or be navigated over the usable area 10 by means of a predetermined travel lane infrastructure 14. The travel lane infrastructure 14 is created in a computer-assisted manner, for example, by means of a so-called lane planning tool. The lane planning tool may be applied on a computer or server, for example in an office environment. The travel lane infrastructure 14 comprises a plurality of travel lanes 16-32. The travel lanes 16-32 run adjacent to one another, preferably at least approximately parallel to one another. The travel lanes 16-32 are preferably linear but may also comprise curvatures, arcs, curves, etc. for bypassing obstacles, for example. The ends of the travel lanes 16-32 may run over further travel lanes 34, 36 which run transversely to the travel lanes 16-32 and/or may be connected via headlands 38 (for reasons of clarity only indicated once in FIG. 1). The travel lane infrastructure 14 is planned such that when the travel lane infrastructure is travelled over by the working machine 12 the usable area 10 may be substantially fully cultivated or treated by an implement of the mobile agricultural working machine.

If the usable area 10 is travelled over by a plurality of working machines 12 which comprise different working widths, preferably this may be already taken into consideration when planning the travel lane infrastructure 14. For example, a distance between respectively adjacent travel lanes 16-32 may correspond to a working width of the working machine 12 with the smallest working width of all of the working machines 12.

The travel lane infrastructure 14 may be planned within an edge contour (for example a field boundary) of the usable area 10. The edge contour may be detected and/or read, for example, by means of a position determining system. It is also conceivable that a so-called land registry extract may be read and/or an application map read or defined and/or corresponding information may be recalled, for example, from a data base.

Expediently, the travel lane infrastructure 14 is planned on a computer externally from the working machine 12. The planned travel lane infrastructure 14 may be transmitted to a control unit of the working machine 12, for example to a data storage device of the control unit. By means of the travel lane infrastructure 14 and a position determining system (for example a GPS system, RTK system) the working machine 12 may be navigated over the usable area 10 along the travel lanes 16-36 and the headland 38. Depending on the design, the working machine 12 may travel and/or be steered autonomously along the travel lane infrastructure 14 or assist the driver by the output of corresponding information, for example on a display, when guiding the working machine 12, for example, within the context of a route planning and/or a route guidance.

The travel lane infrastructure 14 may be used to perform a route planning and route guidance for the working machine 12. The route planning may be undertaken externally from the working machine 12 and/or by means of a navigation system of the working machine 12. The route guidance may be undertaken by the navigation system of the working machine 12. During the route planning, a route for the working machine 12 for travelling over the travel lane infrastructure may be planned such that the working machine 12 may perform the respectively provided working processes in desired sections of the usable area 10.

A particularity of the present disclosure is that a plurality of alternative set point travel speeds may be predetermined for a (route) section (for example 18A) of the travel lane infrastructure 14. In each case, different machine states of the working machine 12 are assigned to the different set point travel speeds. An actual travel speed of the working machine 12 may be adapted, preferably automatically, to the respective set point travel speed as a function of the state in which the working machine 12 actually travels over the corresponding section 18A in practice.

Preferably for a plurality of (route) sections (for example 18A) in each case a plurality of alternative set point speeds may be predetermined as a function of the state of the working machine. For reasons of clarity, only the section 18A is provided with a reference numeral in FIG. 1. As a result, all of the following embodiments relative to the section 18A may also apply to further sections of the usable area 10.

The section 18A of the travel lane infrastructure 14 may be formed by a partial section of one of the travel lanes 16-36 or the headland 38. The section 18A of the travel lane infrastructure 14 may also be formed by one or more of the travel lanes 16-36 and/or the headland 38. The section 18A shown by way of example is substantially formed by the travel lane 18.

When travelling over the section 18A in real time the actual travel speed of the working machine 12 according to the current state of the working machine 12 may be set automatically to the set point travel speed assigned to the current state of the working machine 12. This may enable the section 18A, for example, to be automatically travelled over at a first speed (for example 20 km/h) in an empty run. The same section 18A may be automatically travelled over at a second speed (for example 10 km/h) when treating the usable area 10. The travel speed of the working machine 12 may thus be set as a function of a working process, etc. which is carried out by the working machine 12.

The plurality of alternative set point speeds may be predetermined, for example, by means of the lane planning tool externally from the working machine 12 and transmitted to the control unit of the working machine 12. It is also possible that the alternative set point speeds may be directly input into the control unit of the working machine 12, for example, by means of a user interface of the working machine 12.

Two or more alternative set point travel speeds may be predetermined for the at least one section 18A. If the working machine 12 travels over the section 18A of the travel lane infrastructure 14 in a first state, a first set point travel speed is automatically set. If the working machine 12 travels over the section 18A of the travel lane infrastructure 14 in a second state, a second set point travel speed is automatically set, etc.

Depending on the design of the working machine 12, alternative set point travel speeds may be pre-determined for different states of the working machine 12. Moreover, different set point travel speeds may be predetermined for different sections 18A of the travel lane infrastructure 14 depending on the state of the working machine 12.

For example, the working machine 12 may be operated in a working state. In the working state, the working machine 12 treats or cultivates the usable area 10, for example by soil cultivation, sowing, spraying, fertilizing or harvesting. A set point travel speed which permits an optimal cultivation/treatment of the respective section 18A by the working machine 12 is preferably predetermined here.

It is possible that the working machine 12 is able to be operated in a working position state. In the working position state an implement of the working machine 12 is set in a working position. For example, in the working position the implement (for example a spray boom) may be extended or folded out. The working position state may be a preliminary stage of the working state. The implement is not necessarily activated in the working position state.

It is also possible that the working machine 12 is able to be operated in a transport position state. In the transport position state an implement of the working machine 12 is set in a transport position. For example, in the transport position the implement (for example a spray boom) may be retracted or folded in, for example for travelling on public roads.

It is also possible that the working machine 12 is able to be operated in an empty running state. In the empty running state a storage device (for example an energy storage device, storage tank, operating medium tank or fuel tank) of the working machine 12 is empty or falls below a predetermined limit value. Expediently, the empty running is performed in order to drive the working machine 12 to a charging station or a tank, in order to charge up or fill the storage device there.

Regarding the states of the working machine 12 cited by way of example, alternative set point travel speeds for the section 18A of the usable area 10 may be allocated, for example, such that a set point travel speed in the empty running state ≥ a set point travel speed in the transport position state >a set point travel speed in the working position state ≥ a set point travel speed in the working state, if respectively present.

The alternative set point travel speeds may be predetermined as discrete numerical values. The alternative set point travel speeds may also be predetermined as set point travel speed ranges. The working machine 12 may then set the actual travel speed in the respective section 18A within the set point travel speed range assigned to the current state of the working machine 12.

The actual travel speed may depend on a traction of the working machine 12 and/or a quantity of a material to be distributed, which is to be distributed in the section 18A, within the respective set point travel speed range. For example, in the case of poor traction due to moist or muddy soil, a lower actual travel speed may be set within the respective set point travel speed range. A traction of the working machine 12 may be determined, for example, by a monitoring system (for example an anti-lock braking system) or a sensor system for soil monitoring (for example detection of soil moisture or detection of soil compaction).

The state of the working machine 12 when travelling over the usable area 10 may also have an effect on the arrangement and/or extent of the section 18A. Thus starting points and/or target points of the section 18A may be predetermined as a function of the working machine state. For example, the section 18A for the transport state or empty running state comprises a target point which differs from a target point of the section 18A for the working state. Thus, for example, it is possible that the section 18A is relatively short in the working position since a further section is directly adjacent in which more or less material to be distributed has to be distributed at a greater or lower travel speed. Such a differentiation would not be necessary, for example, if the working machine 12 were in the empty running state or in the transport position state, so that in these cases the section 18A may be longer, for example. Alternatively the section 18A, for example, may be equal for all of the states of the working machine 12.

When the working machine 12 travels over the travel lane infrastructure 14 a control unit of the working machine 12 may have the option in real time to determine independently which of the travel lanes 16-32 currently might be travelled over most expediently.

For example, a storage device (for example a fuel tank, energy storage device, tank for material to be distributed, harvested crop tank, etc.) of the working machine 12 may reach a minimum storage quantity and/or a maximum storage quantity. The control unit of the working machine 12 may find a path automatically starting from the current location, in order to reach the loading and/or unloading point. In a further example, the travel lanes 16-32 are generated for a working width of 6 m. The working machine 12 (for example the field sprayer), however, comprises a working width of 36 m. The control unit of the working machine 12 in this case may preferably be configured such that the working machine 12 automatically travels only each 6th travel lane in a partially or fully automated manner. It might also be conceivable, for example, that the direction of travel is freely selectable.

It is possible that the travel route of the working machine 12 is determined by means of the control unit of the working machine 12 and travelled over on the basis of predetermined and/or selectable criteria. The criteria thereof may be, for example, "fast as possible", "no empty running as far as possible", "no double passes as far as possible" "travel along safety critical regions, or not (e.g. adjacent to roads, or not)", "defined curve radii correspond, for example, to those able to be travelled over by the working machine 12", "is gradient too steep?", etc. The desired criterion or criteria may be selected before the field work by an operator by means of a user interface, for example of the working machine 12.

A further aspect of the present disclosure relates to the planning of at least one curve section of the travel lane infrastructure 14, as is described by way of example hereinafter with reference to FIGS. 2 to 7. The curve section, for example, may be a headland or a curve for bypassing an obstacle.

Expediently, the usable area 10 is not travelled over by only one working machine 12 but in succession by a plurality of working machines 12. For example, initially the soil of the usable area 10 is scarified and/or fertilized by at least one working machine 12. Then seeding is carried out by a further working machine 12. Then the usable area 10 may be fertilized and/or treated with plant protection agent by a further working machine. Finally the plant stock of the usable area 10 may be harvested by a further different working machine 12. In the course of such a cycle (for example a vegetation period) many different working machines 12 may travel over the usable area 10. Typically the different working machines 12 comprise different turning radii.

It has been recognized that it may be advantageous to consider the different turning radii of the working machines 12 already during the planning of the curve sections of the travel lane infrastructure 14.

Figure 2:
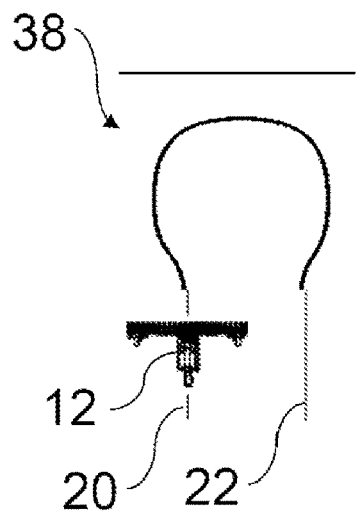
FIG. 2 shows a schematic plan view of a headland with a keyhole-shaped turning variant for turning a mobile agricultural working machine.
Figure 3:
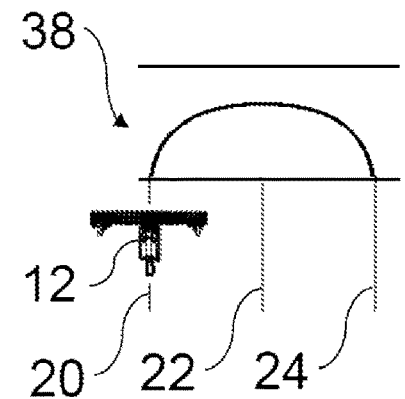
FIG. 3 shows a schematic plan view of a headland with a U-shaped turning variant for turning a mobile agricultural working machine.
Figure 4:
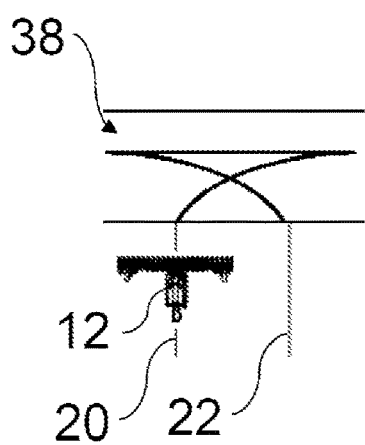
FIG. 4 shows a schematic plan view of a headland with a K-shaped turning variant for turning a mobile agricultural working machine.
Figure 5:
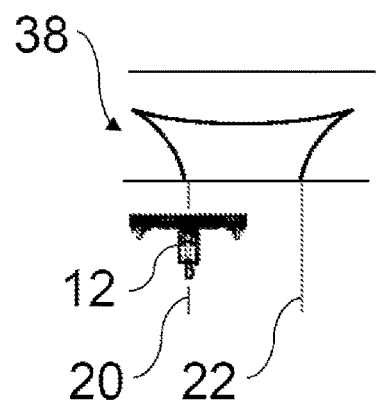
FIG. 5 shows a schematic plan view of a headland with a Y-shaped turning variant for turning a mobile agricultural working machine.

FIGS. 2 to 5 show different variants for turning the working machine 12 in the headland 38 of the usable area 10. FIG. 2 shows a keyhole-shaped turning. FIG. 3 shows a U-shaped turning. FIG. 4 shows a K-shaped turning. FIG. 5 shows a Y-shaped turning. As a result, depending on a turning radius of the working machine 12 and a size of the headland 38 different options are available for turning the working machine 12 and/or generally for the working machine 12 to travel through a curve.

The consideration of the different turning radii of the plurality of working machines 12 with the planning of the curve sections of the travel lane infrastructure 14 in a computer-assisted manner may ensure, for example, that due to the different turning radii in use on the usable area 10 it does not result in approximately the entire area of the headland 38 being travelled over at least once, which could lead to structural damage in the headland 38.

The headland 38, for example, may thus be present in a variant which may be implemented by all of the working machines 12, wherein this variant is expediently adapted to the working machine 12 with the largest turning radius.

The headland 38, however, may also be planned in different variants which are adapted to one another and which have to be travelled over by the different working machines 12. In this case, for example, the variants may be adapted such that the area passed over as a whole according to the plurality of variants is minimized or maximized depending on the respective requirement. The plurality of variants may be adapted to one another such that they coincide as far as possible or as little as possible, depending on the respective requirement. Thus in principle it is possible to target a situation in which no regions are passed over in succession by two or more working machines 12, in order to prevent, for example, too much compaction of these regions. Alternatively, for example, it is possible to target a situation in which as far as possible the same lanes are travelled over by all of the working machines 12 and that, therefore, the area passed-over is kept as small as possible, for example for increasing a yield. This may be particularly expediently used in so-called CTF (controlled traffic farming) applications.

Figure 6:
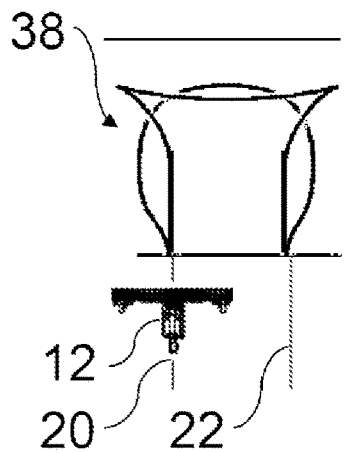
FIG. 6 shows a schematic plan view of a headland with a combined keyhole-Y-shaped turning variant for turning a plurality of mobile agricultural working machines.
Figure 7:
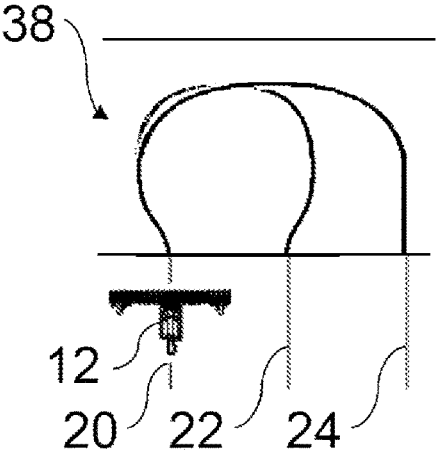
FIG. 7 shows a schematic plan view of a headland with a combined keyhole-U-shaped turning variant for turning a plurality of mobile agricultural working machines.

Purely by way of example FIGS. 6 and 7 show planning results for the headland 38 in which in each case two turning variants have been combined together. In FIG. 6 the headland 38 is planned in a first variant according to a keyhole-shaped turning and is planned in a second variant according to a Y-shaped turning such that the two turning variants are adapted to one another, such that an area of the headland 38 which is as small as possible is passed over as a whole. The same applies to the example of FIG. 7 in which a keyhole-shaped turning and a U-shaped turning as two variants for the headland 38 have been adapted to one another and combined together. For example, it is also possible that in principle the plurality of variants have the same turning shape (for example U-shaped turning, Y-shaped turning, K-shaped turning or keyhole-shaped turning). Generally a number of variants may be ≤ a number of different turning radii of the plurality of working machines 12.

The planning of the headland 38 (and/or generally the curve section) in the one or more variants may in principle be based on a predetermined size (for example length and/or width) of the headland 38 and/or a predetermined (for example polygonal or freeform) shape of the headland 38. It is also possible that the size of the headland 38 and/or generally of the curve section itself is planned in a computer-assisted manner as a function of the different turning radii of the working machines 12, for example by the lane planning tool.

The planning is preferably carried out by means of the lane planning tool externally from the working machines 12 and then transmitted to one respective control unit of the working machine 12 specific to the working machine. In the planning process further parameters may also be considered, such as for example different working widths, different lane widths and/or different wheelbases of the plurality of working machines 12.

The plurality of working machines 12 may comprise different working widths. This may also be considered, for example, in the route planning and route guidance of the respective working machine 12. For example, it is possible to predetermine a main route which may be expediently planned by the working machine 12 with the smallest working width. The main route may pass along all of the travel lanes 16-32 (see FIG. 1). Additionally secondary routes which are specific to the working width or machine may be planned by the travel lane infrastructure 14, said secondary routes for example comprising only each x-th travel lane. For example, a sowing machine as the smallest working machine 12 of the fleet of vehicles comprises a working width of 6 m. The main route leads along all of the travel lanes 16-32 which expediently in each case are arranged at a distance of 6 m from one another. If, for example, a field sprayer also comprises a working width of 36 m, this means that the secondary route may be planned such that only each 6th lane is travelled over by the field sprayer. This route planning may be carried out externally, for example by the lane planning tool or by a navigation system of the respective working machine 12, and preferably automatically.

In the above context, it may be additionally provided that the secondary travel route is planned as a function of a predetermined working width tolerance of the agricultural working machine. Thus, for example, it may be considered that the working width of the working machine 12 which has a large working width is not a whole number multiple of a working width of the working machine 12 which has the smallest working width and/or a distance of the travel lanes 16-32 from one another. Thus, however, it may also be considered, for example, that the travel lanes 16-32 are travelled over as uniformly as possible. The predetermining of the routes may thus be undertaken indirectly as a function of a number of passes. In working machines 12 with a low number of passes due to a large working width, relative to working machines 12 with a large number of passes due to a small working width, the tolerances of a possible deviation may be adjusted up or down depending on how the operator of the working machines 12, for example, would like this to be predetermined.

If the working machine 12 is configured as a distribution machine, the distribution of materials to be distributed may additionally be carried out as a function of the main route and the secondary route(s) of the plurality of working machines 12. Thus, for example, it is possible to provide a setting such that the material to be distributed is distributed or not distributed on travel lanes 16-32 which are travelled over or not travelled over.

A further aspect of the present disclosure is described in more detail hereinafter with reference to FIGS. 8 to 10. This further aspect relates to a planning of a working width path along the travel lanes 16-32 of the travel lane infrastructure 14 relative to a working machine 12 which comprises an adjustable and/or adaptable working width. The variable working width may be enabled, for example, by a partial width of the working width being able to be switched off and/or a distribution device (for example a spray boom) of the working machine 12 being able to be switched off in sections, for example by blocking at least one valve of the distribution device.

Figure 8:
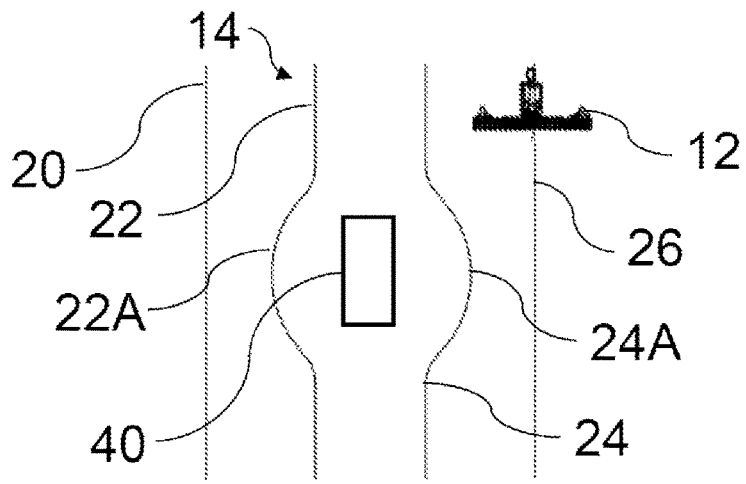
FIG. 8 shows a schematic plan view of a section of a usable agricultural area with an obstacle.

FIG. 8 shows that at least one obstacle 40 may be arranged on the usable area 10. The obstacle 40 may, for example, be a building, a pylon, a pond, etc. The obstacle 40 in the space ahead of the operation of the agricultural working machine 12 may be known. The travel lanes (for example 22 and 24) may be planned for bypassing the obstacle 40. To this end, the travel lanes 22, 24 may comprise in each case a curve section 22A, 24A.

The curve sections 22A, 24A are arcuate. The curve section 22A approaches the travel lane 20 by the curve section 22A bulging outwardly toward the travel lane 20. The curve section 24A approaches the travel lane 26 by the curve section 24A bulging outwardly toward the travel lane 26.

Figure 9:
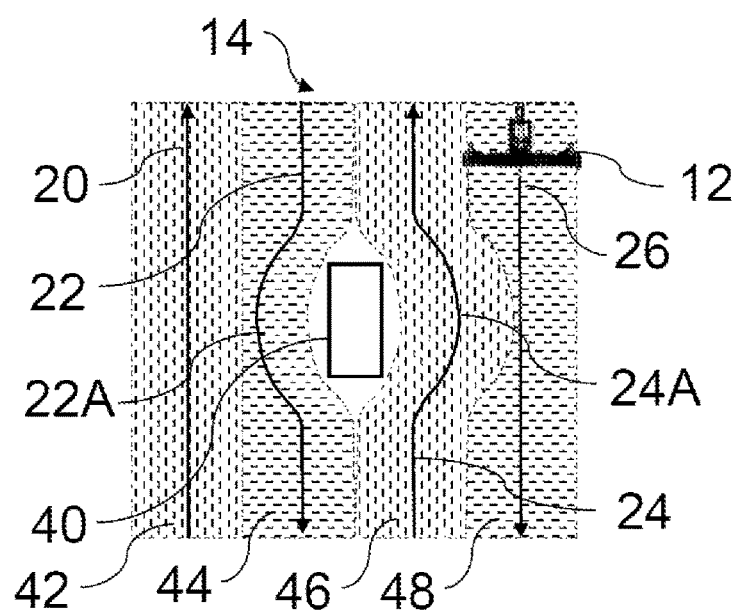
FIG. 9 shows a schematic plan view of the section of a usable agricultural area with the obstacle of FIG. 8 with an indication of a working width path for each travel lane in a first variant.

FIG. 9 shows a variant for planning a path of a working width setting of a variable working width of the working machine 12 along the travel lanes 20-26. According to this variant, the path of the working width setting is implemented for successively following travel lanes 20-26 as a function of the travel lane.

Initially, the working width path 42 is planned relative to the travel lane 20. Due to the linearity of the travel lane 20 the working width path 42 along the travel lane 20 may be preferably planned with a maximum working width. Then the working width path 44 may be planned relative to the travel lane 22. Preferably, the working width path 44 comprises a maximum working width path outside the curve section 22A. In the curve section 22A the working width path 44 is adapted such that there is substantially no covering/overlap with the working width path 42 of the travel lane 20. In the case of a distribution machine, the material to be distributed may also be supplied in the curve section 22A as a function of the angular velocity on the curve, so that less material to be distributed is distributed per time unit on the inside of the curve than on the outside of the curve. The cultivation or treatment which is dependent on the angular velocity may follow a technique which is known, for example, as "curve control" or "contour control" in agriculture.

Subsequently, the working width path 46 may be planned relative to the travel lane 24. Since no overlap exists with the working width path 44 relative to the travel lane 22, it is also possible to plan for a maximum working width in the curve section 24A. In the case of a distribution machine, the material to be distributed may also be supplied in the curve section 24A as a function of the angular velocity on the curve, so that less material to be distributed is distributed per time unit on the inside of the curve than on the outside of the curve.

Finally, the working width path 48 relative to the travel lane 26 may be planned. In order to prevent the working width path 46 coinciding with the curve section 24A, in a linear section of the travel lane 26 opposing the curve section 24A a working width may be adapted to follow an outer contour of the working width path 44, i.e. initially reduced and then increased again.

Figure 10:
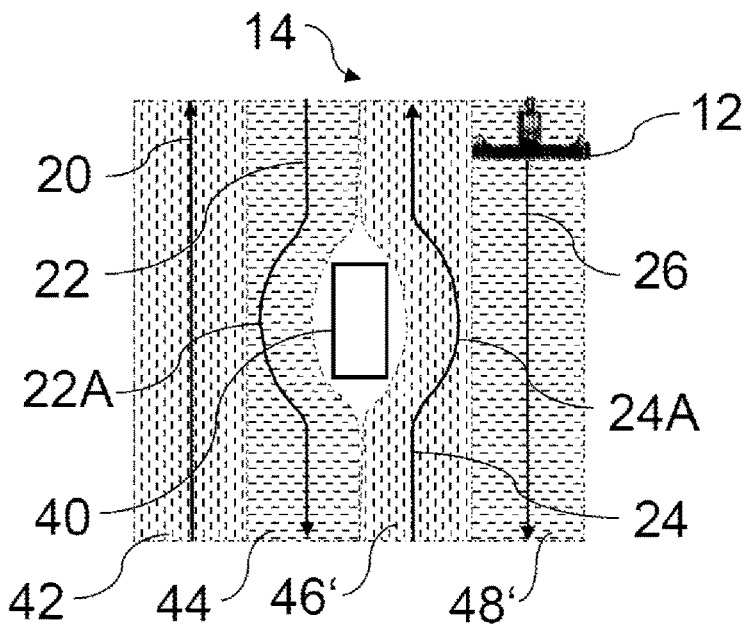
FIG. 10 shows a schematic plan view of the section of a usable agricultural area with the obstacle of FIG. 8 with an indication of a working width path for each travel lane in a second variant.

FIG. 10 shows an advantageous variant for planning a path of a working width setting of a variable working width of the working machine 12 relative to FIG. 9, along the travel lanes 20-26. According to this variant, the path of the working width setting may be implemented in advance as a function of the travel lane, by considering a path of at least the respectively following travel lane. For example, a path of the travel lane 22 is considered in the planning of the working width path 40, a path of the travel lane 24 is considered in the planning of the working width path 42, a path of the travel lane 26 is considered in the planning of the working width path 44, etc.

Particularly preferably, substantially all of the paths of all of the travel lanes 20-26 of the usable area 10 are considered during the planning of all of the working width paths 42-48. On the other hand, for reducing computer effort, it may also be possible that the consideration of the path of the following travel lane is only carried out for a section, in particular a curve section, of a previous travel lane.

This advance planning permits, for example, an equalization of a distribution of a material to be distributed. Thus, for example, area sections in which the material to be distributed is supplied as a function of the angular velocity on the curve may be reduced, whereby as a whole an accuracy of the application of material to be distributed may be increased. A prior calculation may be carried out regarding which partial areas may be treated and/or cultivated most effectively by which of the travel lanes 20-26, for example most uniformly. On the basis thereof, the working processes may also be planned and/or adapted automatically or manually by a lane planning tool and/or by an operator.

In practice, this is shown purely by way of example in FIG. 10 on the working width paths 46' and 48'. Although the travel lane 24 is travelled over by the working machine 12 before the travel lane 26, the working width path 46' is adapted to the path of the travel lane 26 and/or the planned working width path 48'. Since the travel lane 26 is purely linear, a uniform cultivation or treatment of the usable area 10 may be carried out over the entire working width of the working machine 12. The working width path 48' is thus planned with a maximum working width for the travel lane 26. In the curve section 24A this is followed by an adaptation of the working width path 46' to the working width path 48', so as not to generate overlaps. Thus the section of the working width path 46', in which a cultivation or treatment which is dependent on the angular velocity on the curve is required, may also be reduced (see FIGS. 9 and 10). Such a procedure is particularly advantageous when the curve section 24A opposes a linear section of the travel lane 26 as shown in FIG. 10. The procedure may also be advantageous if the curve section 24A is opposed by a curve section of the travel lane 26 which is curved to a lesser extent than the curve section 24A.

In detail the working width path 46' may be planned such that a boundary of the working width path 46' facing the following travel lane 26 follows the path of the following travel lane 26 at substantially the same distance. Thus it may correspondingly arise that in the case of travel lanes located ahead, for example, partial widths (for example spray nozzles) of the implement of the working machine 12 may be initially switched off, although this partial area has not yet been cultivated. This partial area, however, is more effectively cultivated at a later time and/or in the next travel lane 26 if the working machine 12 travels in the opposing direction after turning in the headland.

The planning of the working width paths 40-48' may be carried out externally from the working machine 12 and then transmitted to the working machine 12. It is also possible that a control unit of the working machine 12 plans the working width paths 40-48', for example, before the cultivation and/or treatment of the usable area 10 or in real time when travelling over the usable area 10. Based on the planned working width paths 40-48' the working machine 12 may preferably cultivate and/or treat the usable area 10 in a partially automated or fully automated manner.

It is possible that additionally a distribution of the material to be distributed on the usable agricultural area is planned. The distribution may be at least partially uniform and/or at least partially non-uniform. The planning of the path of the working width setting may also be based on the planned distribution. Thus, for example, it may be planned in advance with which travel lane the required quantity of material to be distributed may be dispensed most effectively.

It is also possible that the planning of the path of the working width setting is carried out by considering previous working processes, i.e. for example performed by means of other working machines. From earlier working processes, for example, it may be identified at which positions of the usable area more or less material to be distributed is to be dispensed. Thus in turn it may be planned in advance with which travel lane the required quantity of material to be distributed may be dispensed most effectively.

The invention is not limited to the above-described preferred exemplary embodiments. Instead a plurality of variants and modifications are possible which also make use of the inventive idea and thus fall within the protected scope. In particular, the invention also claims protection for the subject and the features of the subclaims, irrespective of the claims made by way of reference. In particular, the individual features of the independent claim 1 are disclosed in each case independently of one another. Additionally, the features of the subclaims are also disclosed independently of all of the features of the independent claim 1.

What is claimed is:

1. A method for travel lane planning of a plurality of agricultural working machines, which at least partially comprise different turning radii, on a usable agricultural area, the method, comprising:
   computer-assisted planning of a travel lane infrastructure relative to the usable agricultural area for travel over the usable agricultural area by the plurality of agricultural working machines, wherein the travel lane infrastructure comprises at least one curve section which is planned on a basis of the different turning radii of the plurality of agricultural working machines, wherein the planned travel lane is at least partially implemented on one or more of a plurality of control units, wherein each one of the plurality of control units is associated with a corresponding one of the plurality of agricultural working machines, and wherein:
   the at least one curve section is planned in a single variant which is adapted to the largest turning radius of the different turning radii, so that the plurality of working machines are able to travel over the curved section; and planning a main travel route through the travel lane infrastructure, wherein the main travel route comprises a plurality of travel lanes, and planning at least one secondary travel route through the travel lane infrastructure as a function of one respective working width of one of the plurality of agricultural working machines, wherein the secondary travel route comprises only an x-th lane of the plurality of travel lanes, wherein x is a natural number greater than or equal to 2, wherein the route planning is carried out externally on a planning tool or by a navigation system of the respective working machine;
   modifying steering control for the plurality of working machines based on the planned travel lane infrastructure.

2. The method according to claim 1, wherein:
   the at least one curve section is planned in a plurality of variants for the different turning radii of the plurality of agricultural working machines, wherein:
   a number of variants is less than or equal to a number of the different turning radii; and/or
   the plurality of variants comprises at least one U-shaped turning variant, at least one Y-shaped turning variant, at least one K-shaped turning variant and/or at least one keyhole-shaped turning variant.

3. The method according to claim 2, wherein:
   the plurality of variants are adapted to one another such that an area which is passed over as a whole according to the plurality of variants is minimized; and/or
   the plurality of variants are adapted to one another such that areas which are passed over together according to the plurality of variants are maximized.

4. The method according to claim 2, wherein:
the plurality of variants are adapted to one another such that the plurality of variants substantially do not coincide; or
the plurality of variants are adapted to one another such that areas which are passed over together according to the plurality of variants are minimized.

5. The method according to claim 2, wherein:
the at least one curve section is planned within a region, a dimension, a length, a width, a shape, a freeform or a polygonal shape thereof being predeterminable; or
the at least one curve section is planned within a region, a dimension, a length, a width, a shape, a freeform or a polygonal shape thereof being planned as a function of the different turning radii of the plurality of agricultural working machines.

6. The method according to claim 1, wherein:
the at least one curve section comprises a curve section for bypassing an obstacle on the usable agricultural area; and/or
the at least one curve section comprises a curve section in a headland of the usable agricultural area.

7. The method according to claim 1, wherein the plurality of agricultural working machines comprises:
at least one tractor, at least one distribution machine, at least one sowing machine, at least one field sprayer, at least one fertilizer spreader, at least one harvesting machine and/or at least one soil cultivation machine.

8. The method according to claim 1, wherein:
the planning of the travel lane infrastructure is carried out externally from the plurality of agricultural working machines; and/or
wherein the method also comprises a transmission of the planned travel lane infrastructure to a control unit of one, a plurality, or all of the plurality of agricultural working machines.

9. The method according to claim 1, wherein:
the at least one curve section is additionally planned on a basis of different working widths, different lane widths and/or different wheelbases of the plurality of agricultural working machines.

10. The method according claim 1, wherein:
the plurality of agricultural working machines at least partially comprise different working widths; and
the travel lane infrastructure comprises a plurality of substantially parallel travel lanes which are spaced apart from one another substantially equal to a smallest working width of the plurality of agricultural working machines.

11. The method according to claim 1, wherein:
the planning of the main travel route and/or the at least one secondary travel route is carried out externally from the plurality of agricultural working machines or by one of the plurality agricultural working machines.

12. The method according to claim 1, wherein:
the at least one secondary travel route is planned as a function of a predetermined working width tolerance of at least one of the plurality of agricultural working machines.

13. The method according to claim 1, further comprising:
planning a distribution of a material to be distributed of an agricultural distribution machine of the plurality of agricultural working machines as a function of the main travel route and the at least one secondary travel route of the plurality of agricultural working machines.

14. An agricultural working machine, configured as one of the plurality of agricultural working machines for performing the method according to claim 1, wherein the control unit of the agricultural working machine is configured to assist travel of the agricultural working machine in an automated manner over the usable agricultural area.

* * * * *